United States Patent
Nakashima et al.

(10) Patent No.: US 8,691,711 B2
(45) Date of Patent: Apr. 8, 2014

(54) GLASS FOR DISPLAY DEVICE AND GLASS PLATE

(75) Inventors: Tetsuya Nakashima, Chiyoda-ku (JP); Seiki Ohara, Chiyoda-ku (JP); Tatsuo Nagashima, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 27 days.

(21) Appl. No.: 13/115,626

(22) Filed: May 25, 2011

(65) Prior Publication Data

US 2011/0312483 A1 Dec. 22, 2011

(30) Foreign Application Priority Data

Jun. 18, 2010 (JP) ................................ 2010-139396
Apr. 7, 2011 (JP) ................................ 2011-085445

(51) Int. Cl.
*C03C 3/091* (2006.01)
*C03C 3/083* (2006.01)
*C03C 3/085* (2006.01)

(52) U.S. Cl.
USPC ................................ 501/68; 501/66; 501/69

(58) Field of Classification Search
USPC ..................... 501/66, 67, 68, 69, 70
See application file for complete search history.

(56) References Cited

U.S. PATENT DOCUMENTS

| 6,436,859 | B1 * | 8/2002 | Muramoto et al. ............. 501/69 |
| 7,666,511 | B2 | 2/2010 | Ellison et al. |
| 7,838,136 | B2 | 11/2010 | Nakashima et al. |
| 7,892,999 | B2 | 2/2011 | Nagai et al. |
| 8,076,014 | B2 * | 12/2011 | Tachiwana et al. ........ 428/846.9 |
| 2002/0058463 | A1 | 5/2002 | Kurachi et al. |
| 2005/0211673 | A1 | 9/2005 | Kurachi et al. |
| 2009/0220761 | A1 * | 9/2009 | Dejneka et al. ................ 428/220 |
| 2009/0298669 | A1 | 12/2009 | Akiba et al. |
| 2010/0035745 | A1 | 2/2010 | Murata |
| 2010/0087307 | A1 | 4/2010 | Murata et al. |
| 2010/0119846 | A1 | 5/2010 | Sawada |

FOREIGN PATENT DOCUMENTS

| EP | 2 075 237 A1 | 7/2009 |
| GB | 1 253 284 | 11/1971 |
| JP | 11-171597 | 6/1999 |
| JP | 2002-174810 | 6/2002 |
| JP | 2005-320234 | 11/2005 |
| JP | 2008-115071 | 5/2008 |
| JP | 2010-116276 | 5/2010 |
| JP | 2011-57504 | 3/2011 |
| WO | WO 2008/143999 A1 | 11/2008 |

OTHER PUBLICATIONS

Extended European Search Report issued on Sep. 14, 2011 in the corresponding European Application No. 11004614.1.
U.S. Appl. No. 13/419,115, filed Mar. 13, 2012, Ohara, et al.

* cited by examiner

*Primary Examiner* — Noah Wiese
(74) *Attorney, Agent, or Firm* — Oblon, Spivak, McClelland, Maier & Neustadt, L.L.P.

(57) ABSTRACT

Glass for a display device, which comprises, as represented by mole percentage based on the following oxides, from 61 to 72% of $SiO_2$, from 8 to 17% of $Al_2O_3$, from 6 to 18% of $Li_2O$, from 2 to 15% of $Na_2O$, from 0 to 8% of $K_2O$, from 0 to 6% of $MgO$, from 0 to 6% of $CaO$, from 0 to 4% of $TiO_2$, and from 0 to 2.5% of $ZrO_2$, and having a total content $R_2O$ of $Li_2O$, $Na_2O$ and $K_2O$ of from 15 to 25%, a ratio $Li_2O/R_2O$ of the $Li_2O$ content to $R_2O$ of from 0.35 to 0.8, and a total content of MgO and CaO of from 0 to 9%.

36 Claims, No Drawings

GLASS FOR DISPLAY DEVICE AND GLASS PLATE

The present invention relates to a glass plate for a display device used as e.g. a cover glass of a display device or a constituting member of a chassis in which a display device is contained, and glass for a display device suitable for such a glass plate.

In recent years, for portable devices, e.g. mobile devices such as cell phones and PDA, flat screen televisions particularly large-sized flat screen televisions, use of a cover glass (protective glass) for protecting a display and improving appearance, is increasing. In this specification, a glass plate which also has a function to protect a display, such as an optical filter of a plasma television, is included in a cover glass.

Further, weight reduction and thickness reduction are required for such portable digital devices. Therefore, a cover glass used for protecting a display is also required to be thin. However, if the thickness of the cover glass is made to be thin, the strength is lowered, and if a portable device is hit by something during its use or the portable device is dropped at the time of carrying it, the cover glass itself may sometimes be broken. Therefore, there is a problem that the cover glass cannot accomplish the original object to protect display devices.

Further, in the case of a large-sized flat screen television, the cover glass itself is large, and accordingly the probability of the breakage is high, and in addition, it has been required to make the cover glass thin for weight reduction, and in this view also, the probability of the breakage of the cover glass is high.

In order to solve the above problem, it is conceivable to improve the strength of the cover glass, and as such a method, a method to form a compressive stress layer on a glass surface is commonly known.

As the method to form a compressive stress layer on a glass surface, typical are an air quenching tempering method (physical tempering method) wherein a surface of a glass plate heated to near the softening point is quenched by air cooling or the like and a chemical tempering method wherein alkali metal ions having a small ion radius (typically Li ions or Na ions) on a glass plate surface are exchanged with alkali ions having a larger ion radius (typically K ions) by ion exchange at a temperature lower than the glass transition point.

As mentioned above, the thickness of the cover glass is required to be thin. If the air quenching tempering method is applied to a thin glass plate, the temperature difference between the surface and the inside tends not to arise, and it is thereby difficult to form a compressive stress layer, and the desired property of high strength cannot be obtained. Therefore, a cover glass tempered by the latter chemical tempering method has been proposed (Patent Documents 1 to 3).

Patent Document 1: JP-A-2005-320234
Patent Document 2: U.S. Patent Application Publication No. 2009/298669
Patent Document 3: WO2008/143999

In Examples disclosed in Patent Documents 1 to 3, chemical tempering treatment at a high temperature exceeding 450° C. or chemical tempering treatment for a long period of time exceeding 4 hours is required in all cases. For example, with respect to the after-mentioned glass G55, which is the glass disclosed in Patent Document 3, if a desired compressive stress layer is to be formed by chemical tempering treatment employing potassium nitrate molten salt, the glass must be immersed in the molten salt over a long period of time of 6 hours if the temperature of the molten salt is 400° C. The surface compressive stress and the thickness of a compressive stress layer formed by such chemical tempering treatment were 800 MPa and 37 μm, respectively.

For chemical tempering, nitrate salts of sodium and potassium are typically used, and at a temperature exceeding 450° C., the vapor pressures of them tend to be high, and they are very likely to volatilize. If such volatilization occurs, the quality of glass subjected to chemical tempering tends to be unstable and in addition, ancillary facilities to recover the volatilized products will be required, such being problematic in view of the quality and the cost. Further, chemical tempering treatment for a long period of time leads directly to the cost increase and is thereby unfavorable.

The present invention has been made to solve the above-mentioned conventional problems, and it is an object of the present invention to provide glass for a display device which will have sufficient strength by chemical tempering at low temperature for a short time, a glass plate for a display device obtained by subjecting a glass plate made of such glass for a display device to chemical tempering, a method for producing a glass plate for a display device by subjecting a glass plate made of glass for a display device to chemical tempering, and a display device using such a glass plate for a display device for protecting the display.

The present invention provides glass for a display device, which comprises, as represented by mole percentage based on the following oxides, from 61 to 72% of $SiO_2$, from 8 to 17% of $Al_2O_3$, from 6 to 18% of $Li_2O$, from 2 to 15% of $Na_2O$, from 0 to 8% of $K_2O$, from 0 to 6% of MgO, from 0 to 6% of CaO, from 0 to 4% of $TiO_2$, and from 0 to 2.5% of $ZrO_2$ and having a total content $R_2O$ of $Li_2O$, $Na_2O$ and $K_2O$ of from 15 to 25%, a ratio $Li_2O/R_2O$ of the $Li_2O$ content to $R_2O$ of from 0.35 to 0.8, and a total content of MgO and CaO of from 0 to 9% (hereinafter this glass will sometimes be referred to as the glass of the present invention). In this specification, the wording "comprising from 0 to 8% of $K_2O$" for example means that $K_2O$ is not essential but may be contained within a range up to 8%.

The present invention further provides the above glass for a display device, which contains at most 68% of $SiO_2$, at most 15% of $Al_2O_3$, at most 16% of $Li_2O$, at most 13% of $Na_2O$, at most 7% of $K_2O$, from 0 to 5% of MgO, from 0 to 5% of CaO, and from 0 to 2% of $TiO_2$, and has $R_2O$ of from 16 to 23% and $Li_2O/R_2O$ of at least 0.4.

The present invention further provides the above glass for a display device, which contains at most 70% of $SiO_2$, at most 15% of $Al_2O_3$, at least 10% of $Li_2O$, at most 10% of $Na_2O$, and from 0 to 6% of $K_2O$, and has $R_2O$ of at most 22% and $Li_2O/R_2O$ of at least 0.6.

The present invention further provides the above glass for a display device, which contains at most 68% of $SiO_2$, at most 15% of $Al_2O_3$, at least 12% of $Li_2O$, at most 6% of $Na_2O$, from 0 to 3% of $K_2O$, at least 1% of MgO, from 0 to 2% of CaO, and from 0 to 1% of $TiO_2$, and has $R_2O$ of at most 22% and $Li_2O/R_2O$ of at least 0.7.

Further, the present invention provides the above glass for a display device, which has a fracture toughness value of at least $0.85$ MPa·m$^{1/2}$.

The present invention further provides a glass plate made of the above glass for a display device, produced by a float process or a fusion method.

The present invention further provides a glass plate for a display device, obtained by subjecting a glass plate made of the above glass for a display device to chemical tempering treatment.

The present invention further provides the above glass plate for a display device, wherein the glass plate is produced by a float process or a fusion method, and the surface is a fire polished surface which is not polished.

The present invention further provides the above glass plate for a display device, which has a fracture toughness value of at least $1.0$ MPa·m$^{1/2}$.

The present invention further provides a method for producing a glass plate for a display device, which comprises immersing a glass plate made of glass for a display device comprising, as represented by mole percentage based on the following oxides, from 61 to 72% of $SiO_2$, from 8 to 17% of $Al_2O_3$, from 6 to 18% of $Li_2O$, from 2 to 15% of $Na_2O$, from 0 to 8% of $K_2O$, from 0 to 6% of MgO, from 0 to 6% of CaO, from 0 to 4% of $TiO_2$, and from 0 to 2.5% of $ZrO_2$, and having a total content $R_2O$ of $Li_2O$, $Na_2O$ and $K_2O$ of from 15 to 25%, a ratio $Li_2O/R_2O$ of the $Li_2O$ content to $R_2O$ of from 0.35 to 0.8, and a total content of MgO and CaO of from 0 to 9%, in a molten salt to carry out chemical tempering treatment, wherein the molten salt comprises, as represented by mole percentage, from 0 to 7% of $LiNO_3$, from 10 to 100% of $NaNO_3$, and from 0 to 90% of $KNO_3$.

The present invention further provides the above process for producing a glass plate for a display device, wherein the chemical tempering treatment is carried out by immersing the glass plate in the molten salt at a temperature of at most 425° C. for an immersion time of at most 2 hours.

The present invention further provides a display device having a cover glass, wherein the cover glass is the above glass plate for a display device.

The present invention further provides a portable device provided with the above display device.

The present invention further provides a television provided with the above display device.

The present invention further provides a touch panel provided with the above display device.

The present invention still further provides a chassis in which a display device is contained, which has the above glass plate for a display device.

The present inventors have found that it is effective to optimize the $Al_2O_3$ content and the $Li_2O/R_2O$ ratio so as to obtain sufficient strength by chemical tempering at low temperature for a short period of time, and accomplished the present invention. Further, they have found that it is effective that the molten salt contains $NaNO_3$ so as to obtain sufficient strength by chemical tempering at low temperature for a short period of time, and accomplished the present invention.

According to the present invention, glass for a display device having a high fracture toughness value can be obtained.

Further, it is possible to obtain sufficient strength of a glass plate for a display device even by chemical tempering at low temperature for a short period of time.

Further, by the chemical tempering treatment, not only the fracture toughness value of a glass plate can be increased, but also its increasing rate can be made high.

Now, the present invention will be described in further detail with reference to the preferred embodiments.

The thickness of the glass plate for a display device of the present invention (hereinafter referred to as a glass plate of the present invention) is typically from 0.2 to 1.0 mm. If the thickness is less than 0.2 mm, a problem may arise from the viewpoint of the strength for practical use.

The thickness t of the surface compressive stress layer of the glass plate of the present invention is preferably larger than 25 μm. If it is at most 25 μm, the glass may be fragile. It is more preferably at least 30 μm, particularly preferably at least 40 μm, typically at least 45 μm or at least 50 μm.

The surface compressive stress S of the glass plate of the present invention is typically at least 100 MPa and less than 1,200 MPa. If it is less than 100 MPa, the glass may be fragile. It is preferably at least 200 MPa.

The fracture toughness value of the glass plate of the present invention is preferably at least $1.0$ MPa·m$^{1/2}$. If it is less than $1.0$ MPa·m$^{1/2}$, the glass may be fragile. It is more preferably at least $1.1$ MPa·m$^{1/2}$, particularly preferably at least $1.2$ MPa·m$^{1/2}$, typically at least $1.3$ MPa·m$^{1/2}$. The fracture toughness value is measured, for example, by the indentation-fracture method (IF) method in accordance with JIS R1607.

The glass plate of the present invention is obtained by subjecting a glass plate made of the glass of the present invention to chemical tempering.

The method for producing a glass plate made of the glass of the present invention is not particularly limited, and the glass plate is produced, for example, by mixing various materials in appropriate amounts, heating the mixture to from about 1,400 to about 1,600° C. to melt it, then defoaming and homogenizing it by stirring, forming it into a plate shape by a well-known float process, down draw method (e.g. fusion method), press method or the like, annealing the plate shape product and cutting it in a desired size, followed by polishing.

The chemical tempering method is not particularly limited so long as $Li_2O$ and $Na_2O$ in the surface layer of the glass plate can be ion exchanged with $Na_2O$ and $K_2O$ in the molten salt, and a method may, for example, be mentioned wherein the glass plate is immersed in a heated sodium nitrate ($NaNO_3$) molten salt, potassium nitrate ($KNO_3$) molten salt or mixed molten salt thereof.

Now, the composition of the molten salt to be used in the method for producing a glass plate for a display device of the present invention will be described as represented by mole percentage.

Sodium nitrate ($NaNO_3$) is an essential component for chemical tempering at low temperature for a short period of time. If its content is less than 10%, the surface compressive stress and the thickness of the surface compressive stress layer will be small. It is preferably at least 20%, more preferably at least 40%, particularly preferably at least 60%.

Potassium nitrate ($KNO_3$) is not essential but may be contained up to 90% to control the chemical tempering properties. If its content exceeds 90%, the surface compressive stress or the thickness of the surface compressive stress layer may be small. It is preferably at most 80%, more preferably at most 60%, particularly preferably at most 40%.

Lithium nitrate ($LiNO_3$) is not essential but may be contained up to 7% so as to control the chemical tempering properties or to reduce the warpage after the chemical tempering. If its content exceeds 7%, the surface compressive stress may be small. It is preferably at most 6%, more preferably at most 4%, particularly preferably at most 2%.

The conditions for forming a chemically tempered layer (surface compressive stress layer) having a desired surface compressive stress on the glass plate vary depending on the thickness of the glass plate, and typically, the glass plate is immersed in an alkali nitrate molten salt at from 300 to 450° C. for from 10 minutes to 4 hours. From the economical viewpoint, the glass plate is preferably immersed at from 300 to 425° C. for from 10 minutes to 2 hours.

Now, the composition of the glass of the present invention will be described by using contents represented by mole percentage unless otherwise specified.

$SiO_2$ is a component to constitute a glass matrix and is essential. If its content is less than 61%, stability of glass will be decreased, or the surface roughening is likely to occur after the chemical tempering. It is preferably at least 61.5%, more preferably at least 64%. If the $SiO_2$ content exceeds 72%, the viscosity of glass will be increased, and the melting property is remarkably lowered. It is preferably at most 70%, typically at most 68%.

$Al_2O_3$ is a component to improve the ion exchange rate and is essential. If its content is less than 8%, the ion exchange rate will be low. It is preferably at least 9%, typically at least 10%. If the $Al_2O_3$ content exceeds 17%, the viscosity of the glass will be high, and homogeneous melting will be difficult, or the surface roughening is likely to occur after the chemical tempering. It is preferably at most 15%, more preferably at most 14%, typically at most 13%.

$Li_2O$ is a component to form the surface compressive stress layer by ion exchange and to improve the melting property of glass, and is essential. If its content is less than 6%, it is difficult to form a desired surface compressive stress layer by ion exchange. It is preferably at least 7%, typically at least 8%. It is preferably at least 10 when $Li_2O/R_2O$ is at least 0.6, and it is preferably at least 12% when $Li_2O/R_2O$ is at least 0.7. If the $Li_2O$ content exceeds 18%, the weather resistance will be decreased, or the surface roughening is likely to occur after the chemical tempering. It is preferably at most 16%, typically at most 14%.

$Na_2O$ is a component to form the surface compressive stress layer by ion exchange and to improve the melting property of glass, and is essential. If its content is less than 2%, it will be difficult to form a desired surface compressive stress layer by ion exchange. It is preferably at least 3%, typically at least 4%. If the $Na_2O$ content exceeds 15%, the weather resistance will be decreased, or the surface roughening is likely to occur after the chemical tempering. It is preferably at most 13%, typically at most 12%. In a case where the surface compressive stress is to be greater, it is preferably at most 10% e.g. when $Li_2O/R_2O$ is at least 0.6, and it is preferably at most 6% e.g. when $Li_2O/R_2O$ is at least 0.7.

$K_2O$ is not essential but may be contained up to 8% to improve the melting property or for another purpose. If the $K_2O$ content exceeds 8%, the weather resistance will be decreased, or the surface roughening is likely to occur after the chemical tempering. It is preferably at most 7%, typically at most 6%. It is preferably at most 6%, more preferably at most 3%, typically no $K_2O$ is contained when $Li_2O/R_2O$ is at least 0.6, and it is preferably at most 3%, typically no $K_2O$ is contained when $Li_2O/R_2O$ is at least 0.7. In a case where $K_2O$ is contained, its content is preferably at least 1%, more preferably at least 2.5%.

If the total content $R_2O$ of $Li_2O$, $Na_2O$ and $K_2O$ is less than 15%, no desired ion exchange property will be obtained. It is preferably at least 16%, more preferably at least 17%. If $R_2O$ exceeds 25%, the chemical durability such as the weather resistance of glass will be low. It is preferably at most 24%, typically at most 23%. It is preferably at most 22% when $Li_2O/R_2O$ is at least 0.6.

In order to obtain sufficient strength by chemical tempering at low temperature for a short period of time, it is necessary that $Li_2O/R_2O$ is within a range of at least 0.35 and at most 0.8. It is more preferably at least 0.4. In such a case, $Li_2O/R_2O$ is sometimes made to be at most 0.7. In order to obtain more sufficient strength by chasmal tempering, $Li_2O/R_2O$ is preferably at least 0.6, more preferably at least 0.7.

Both MgO and CaO are not essential, but may be contained up to 6% each, or up to 9% in total, to improve the melting property of glass or for another purpose. If the total content exceeds 9%, the ion exchange may be inhibited, and no desired surface compressive stress layer will be formed, or the glass will be fragile. It is preferably at most 8%, typically at most 5%.

MgO is preferably contained e.g. in a case where the melting property is to be improved. In such a case, the MgO content is preferably at least 1%.

Further, CaO more significantly inhibits the ion exchange, and accordingly its content is preferably at most 6% even when contained.

$TiO_2$ is not essential but may be contained up to 4% to improve the weather resistance and the melting property of glass, or for another purpose. If its content exceeds 4%, the glass will be fragile, or a phase separation phenomenon is likely to occur. It is preferably at most 2%, and it is typically at most 1% e.g. when $Li_2O/R_2O$ is at least 0.7.

$ZrO_2$ is not essential but may be contained up to 2.5% to improve the weather resistance and the melting property of glass, or for another purpose. If its content exceeds 2.5%, the glass will be fragile, or a phase separation phenomenon is likely to occur. It is preferably at most 2%, typically at most 1.5%. The $ZrO_2$ content is typically at most 5% as represented by mass percentage.

The glass of the present invention essentially comprises the above-described components, but may contain other components within a range not to impair the object of the present invention. In a case where such other components are contained, the total content of such components is preferably at most 10%, typically at most 5%. Now, the above other components will be explained.

Each of SrO and BaO has a high effect of decreasing the ion exchange rate, and accordingly they are not contained, or even if contained, the total content is preferably less than 1%.

$B_2O_3$ may be contained, for example, up to 1% to improve the melting property at high temperature or the glass strength. If its content exceeds 1%, no homogeneous glass is likely to be obtained, and forming of the glass may be difficult. Typically no $B_2O_3$ is contained.

As a refining agent at the time of melting glass, $SO_3$, a chloride or a fluoride may appropriately be contained. However, in order to increase the visibility of display devices, it is preferred to reduce contamination of impurities such as $Fe_2O_3$, NiO or $Cr_2O_3$ having an absorption in a visible light range in raw materials as far as possible, and the content of each of them is preferably at most 0.15%, more preferably at most 0.05% as represented by mass percentage.

The display device of the present invention is typically, with respect to portable devices, a cell phone, a personal digital assistant (PDA), a smart phone, a net book or a car navigation system, and with respect to devices not assumed to be carried, a flat screen television (including a 3D television) such as a liquid crystal television or a plasma television, or a display of e.g. a desktop personal computer or a display for a monitor. Further, from another viewpoint, a touch panel may also be mentioned.

Now, the present invention will be described in further detail with reference to Examples. However, it should be understood that the present invention is by no means restricted to such specific Examples.

Glass plates made of Glass G1 to G6 and G51 to G55 each having a composition as represented by mole percentage shown in columns of $SiO_2$ to $B_2O_3$ in Table 1, and having a size of 40 mm×40 mm×0.8 mm in thickness, were prepared. G1 to G6 corresponds to Examples of the glass of the present invention, and G51 to G55 correspond to Comparative Examples. Li/R in Table 1 represents $Li_2O/R_2O$.

With respect to glass G1 to G6 and G51 to G54, the above glass plate was prepared as follows. That is, commonly used glass raw materials such as oxides, hydroxides, carbonates and nitrates were properly selected and weighed to obtain 400 g of glass, and in addition, although not shown in the above-mentioned compositions, sodium sulfate corresponding to 0.2 mass % as calculated as $SO_3$ was added to the raw materials, and the raw materials were mixed. Then, the raw material mixture was put in a platinum crucible, the platinum crucible was put in a resistance heat type electric furnace at 1,600° C., the raw material mixture was melted for 3 hours, refined, homogenized and cast into a mold, and annealed at a predetermined temperature to obtain a glass block. The glass block was cut and polished and finally both surfaces were mirror polished to obtain a glass plate having a size of 40 mm×40 mm×0.8 mm in thickness.

With respect to the obtained glass plate, the fracture toughness value $Kc_0$ (unit: $MPa \cdot m^{1/2}$) was measured by an IF method (indentation-fracture method) in accordance with JIS R1607. That is, using a Vickers hardness tester, an indentation was made under an indentation load of 5 kgf for a retention time of 15 seconds, and 15 seconds later, the diagonal length and the crack length of the indentation were measured by using a microscope attached to the tester, and such an operation was repeatedly carried out 10 times, and the fracture toughness value was calculated in accordance with the following formula:

$$\text{Fracture toughness value} = 0.026 \times (E \times P)^{1/2} \times a \times c^{-3/2}$$

wherein E is the Young's modulus, which was measured by the ultrasonic pulse method with respect to a glass plate having a thickness of from 4 to 10 mm and a size of about 4 cm×4 cm, P is the indentation load (unit: N), a (unit: m) is the half of the average of the diagonal length of the indentation, and c (unit: m) is the half of the average of the crack length.

The results are shown in Table 1. As evident from Table 1, the glass of the present invention has a high fracture toughness value of higher than 0.85 $MPa \cdot m^{1/2}$.

Glass plates of G1 to G6 and G51 to G54 were immersed in a molten salt comprising 5 mol % of $LiNO_3$, 45 mol % of $NaNO_3$ and 50 mol % of $KNO_3$ at a temperature of 400° C. for 0.5 hour to carry out chemical tempering treatment (Examples A1 to A10).

With respect to the glass plates subjected to chemical tempering treatment, the fracture toughness value $Kc_1$ was measured in the same manner as in the measurement of $Kc_0$, and the surface compressive stress S (unit: MPa) and the thickness t (unit: μm) of the compressive stress layer were measured by birefringence imaging system Abrio (tradename) manufactured by Tokyo Instruments, Inc. to measure the above S and t, from the glass plate having a size of 40 mm×40 mm×0.8 mm in thickness, a small piece having a length of 40 mm, a width of about 1 mm and a thickness of 0.8 mm was cut, and two facing surfaces of 40 mm×0.8 mm were mirror polished to obtain a measurement sample having a width of 0.3 mm.

The results are shown in Table 2. In Table 2, the Kc ratio means $Kc_1/Kc_0$. Further, in Example A9, the glass was broken at the time of processing to form a sample after the chemical tempering treatment, and S, t and $Kc_1$ could not be measured. This is considered to be because a large amount of $K_2O$ was contained in glass G53 used in Example A9, this $K_2O$ was ion exchanged with Li or Na in the molten salt, and as a result, a tensile stress layer, not a compressive stress layer, was formed on the surface of the glass plate in Example A9.

A glass plate made of glass G55 containing a large amount of $Na_2O$ was not subjected to such chemical tempering treatment, and it is considered that a tensile stress layer will be formed on the surface in the same manner as in Example A9 if such chemical tempering treatment is carried out.

As evident from the above description, S after chemical tempering treatment of the glass of the present invention is at least 100 MPa and t is at least 30 μm, and a desired compressive stress layer is obtained by chemical tempering treatment in a short period of time of 0.5 hour (Examples A1 to A6). Further, the Kc ratio is at least 1.5, which is higher than the cases (Examples A7, A8 and A10) wherein the glass in Comparative Example was used.

TABLE 1

| | Glass | | | | | | | | | | |
| --- | --- | --- | --- | --- | --- | --- | --- | --- | --- | --- | --- |
| | G1 | G2 | G3 | G4 | G5 | G6 | G51 | G52 | G53 | G54 | G55 |
| $SiO_2$ | 61.9 | 64.5 | 62.0 | 63.5 | 65.0 | 65.0 | 62.0 | 62 | 62 | 68 | 66 |
| $Al_2O_3$ | 13.0 | 12.0 | 13.0 | 11.5 | 10.0 | 10.0 | 13.0 | 13 | 13 | 7 | 10 |
| $Li_2O$ | 10.7 | 12.8 | 10.0 | 10.0 | 10.0 | 8.0 | 6.7 | 5 | 5 | 10 | 0 |
| $Na_2O$ | 6.8 | 5.5 | 5.0 | 5.0 | 5.0 | 10.0 | 6.7 | 10 | 5 | 5 | 14 |
| $K_2O$ | 3.0 | 3.4 | 5.0 | 5.0 | 5.0 | 0 | 6.6 | 5 | 10 | 5 | 2 |
| MgO | 3.0 | 0 | 3.0 | 3.0 | 3.0 | 3.0 | 3.0 | 3 | 3 | 3 | 6 |
| CaO | 0 | 0 | 0 | 0 | 0 | 4 | 0 | 0 | 0 | 0 | 1 |
| $TiO_2$ | 1.0 | 0 | 0 | 0 | 0 | 0 | 0 | 0 | 0 | 0 | 0 |
| $ZrO_2$ | 0.6 | 1.8 | 2.0 | 2.0 | 2.0 | 0 | 2.0 | 2 | 2 | 2 | 0 |
| $B_2O_3$ | 0 | 0 | 0 | 0 | 0 | 0 | 0 | 0 | 0 | 0 | 1 |
| Li/R | 0.52 | 0.59 | 0.50 | 0.50 | 0.50 | 0.44 | 0.34 | 0.25 | 0.25 | 0.50 | 0 |
| $Kc_0$ | 0.94 | 0.93 | 0.89 | 0.87 | 0.88 | 0.88 | 0.81 | 0.78 | 0.72 | 0.82 | 0.71 |

TABLE 2

| | Ex. | | | | | | | | | |
|---|---|---|---|---|---|---|---|---|---|---|
| | A1 | A2 | A3 | A4 | A5 | A6 | A7 | A8 | A9 | A10 |
| Glass | G1 | G2 | G3 | G4 | G5 | G6 | G51 | G52 | G53 | G54 |
| S | 150 | 180 | 130 | 130 | 100 | 100 | 30 | 0 | — | 50 |
| t | 50 | 50 | 40 | 35 | 30 | 30 | 25 | — | — | 25 |
| $Kc_1$ | 1.6 | 1.7 | 1.4 | 1.3 | 1.3 | 1.3 | 1.0 | 0.70 | — | 1.0 |
| Kc ratio | 1.7 | 1.8 | 1.6 | 1.5 | 1.5 | 1.5 | 1.2 | 0.9 | — | 1.2 |

Further, the glass plates of G1 to G6 were immersed in a molten salt comprising 0 mol % of $LiNO_3$, 50 mol % of $NaNO_3$ and 50 mol % of $KNO_3$ at a temperature of 400° C. for 0.5 hour to carry out chemical tempering treatment (Examples B1 to B6). With respect to the glass plates subjected to chemical tempering treatment, $Kc_1$ was measured. The results are shown in Table 3 together with the Kc ratio. In Table 3, values of S and t are estimated values calculated from the composition, etc.

TABLE 3

| | Ex. | | | | | |
|---|---|---|---|---|---|---|
| | B1 | B2 | B3 | B4 | B5 | B6 |
| Glass | G1 | G2 | G3 | G4 | G5 | G6 |
| S | 230 | 230 | 230 | 200 | 180 | 180 |
| t | 50 | 50 | 40 | 35 | 30 | 30 |
| $Kc_1$ | 1.9 | 1.9 | 1.9 | 1.8 | 1.7 | 1.7 |
| Kc ratio | 2.0 | 2.0 | 2.1 | 2.1 | 1.9 | 1.9 |

Further, the glass plate of G1 was immersed in each of various molten salts having compositions as represented by mole percentage shown in columns of $LiNO_3$ to $KNO_3$ in Table 4 at a temperature of 350° C. for 2 hours. With respect to such glass plates subjected to chemical tempering treatment, S, t and $Kc_1$ were measured. The results are shown in Table 4 (Examples C1 to C7).

In Examples C1 to C4 which are Examples of the method for producing a glass plate for a display device of the present invention, S is at least 130 MPa and the Kc ratio is at least 1.7, whereas in Examples C5 to C7 which are Comparative Examples, S is at most 30 MPa, and the Kc ratio is at most 1.4.

TABLE 4

| | Ex. | | | | | | |
|---|---|---|---|---|---|---|---|
| | C1 | C2 | C3 | C4 | C5 | C6 | C7 |
| $LiNO_3$ | 0 | 0 | 0 | 5 | 0 | 10 | 15 |
| $NaNO_3$ | 25 | 50 | 75 | 45 | 0 | 40 | 35 |
| $KNO_3$ | 75 | 50 | 25 | 50 | 100 | 50 | 50 |
| S | 200 | 250 | 350 | 130 | 30 | 30 | 0 |
| t | 40 | 50 | 60 | 50 | 35 | 50 | — |
| $Kc_1$ | 2.0 | 1.8 | 2.0 | 1.6 | 1.2 | 1.3 | 0.89 |
| Kc ratio | 2.1 | 1.9 | 2.1 | 1.7 | 1.3 | 1.4 | 0.95 |

Further, glass plates made of glass D1 to D4 having compositions as represented by mole percentage in columns of $SiO_2$ to $ZrO_2$ in Tables 5 and 6, having a size of 40 mm×40 mm×1.0 mm in thickness, were prepared in the same method as described above. Further, with respect to D1 to D3, D5 and D8, $Kc_0$ was measured, and with respect to the other glass, $Kc_0$ was measured by calculation from the composition.

Such glass plates were immersed in a molten salt comprising 100 mol % of $NaNO_3$ at a temperature of 400° C. for one hour to carry out chemical tempering treatment, and S and t were measured in the same manner as described above. The results are shown in Tables 5 and 6.

Further, a glass plate made of glass G2 in Table 1 was also subjected to chemical tempering treatment in the same manner and as a result, S was 286 MPa, and t was 58 μm.

Such glass plates subjected to chemical tempering treatment had S greater than those of Examples B1 to B6 and C1 to C7, and accordingly even if it was attempted to make an indentation on the glass plate by the above-described method, no indentation could not be made, or the glass was broken, and thus $Kc_1$ could not be measured. Further, glass D15 to D20 in Table 6 correspond to Examples of the glass of the present invention with which when a glass plate is immersed in a molten salt comprising 100 mol % of $NaNO_3$ at a temperature of 400° C. for one hour to carry out chemical tempering treatment, a great S of at least 250 MPa is obtained. Whereas, chemical tempering treatment is carried out in the same manner with glass G54 in Table 1, S is 220 MPa, and t and 55 μm.

TABLE 5

| | Glass | | | | | | | | | |
|---|---|---|---|---|---|---|---|---|---|---|
| | D1 | D2 | D3 | D4 | D5 | D6 | D7 | D8 | D9 | D10 |
| $SiO_2$ | 64.0 | 64.0 | 64.0 | 64.0 | 64.0 | 66.0 | 62.0 | 64.0 | 64.0 | 64.0 |
| $Al_2O_3$ | 12.0 | 12.0 | 12.0 | 12.0 | 13.0 | 10.0 | 14.0 | 12.0 | 12.0 | 12.0 |
| $Li_2O$ | 12.0 | 12.0 | 16.0 | 12.0 | 16.0 | 16.0 | 16.0 | 14.4 | 12.8 | 16.0 |
| $Na_2O$ | 8.0 | 4.0 | 4.0 | 4.0 | 4.0 | 4.0 | 4.0 | 3.6 | 3.2 | 2.0 |
| $K_2O$ | 0 | 4.0 | 0.0 | 0 | 0 | 0 | 0 | 0 | 0 | 2.0 |
| MgO | 2.0 | 2.0 | 2.0 | 6.0 | 2.0 | 2.0 | 2.0 | 4.0 | 6.0 | 2.0 |
| CaO | 0 | 0 | 0 | 0 | 0 | 0 | 0 | 0 | 0 | 0 |
| $ZrO_2$ | 2.0 | 2.0 | 2.0 | 2.0 | 1.0 | 2.0 | 2.0 | 2.0 | 2.0 | 2.0 |
| Li/R | 0.60 | 0.60 | 0.80 | 0.75 | 0.80 | 0.80 | 0.80 | 0.80 | 0.80 | 0.80 |

TABLE 5-continued

| | Glass | | | | | | | | | |
|---|---|---|---|---|---|---|---|---|---|---|
| | D1 | D2 | D3 | D4 | D5 | D6 | D7 | D8 | D9 | D10 |
| $Kc_0$ | 0.94 | 0.96 | 0.92 | 1.01 | 1.02 | 0.99 | 1.00 | 1.02 | 1.02 | 0.98 |
| S | 441 | 518 | 528 | 484 | 576 | 468 | 506 | 592 | 557 | 489 |
| t | 88 | 76 | 81 | 65 | 86 | 72 | 73 | 68 | 65 | 52 |

TABLE 6

| | Glass | | | | | | | | | |
|---|---|---|---|---|---|---|---|---|---|---|
| | D11 | D12 | D13 | D14 | D15 | D16 | D17 | D18 | D19 | D20 |
| $SiO_2$ | 65.0 | 65.5 | 68.0 | 66.0 | 67.5 | 66.0 | 67.0 | 66.0 | 67.5 | 70.0 |
| $Al_2O_3$ | 12.0 | 12.0 | 8.0 | 10.0 | 12.0 | 13.0 | 10.0 | 11.0 | 9.0 | 8.5 |
| $Li_2O$ | 16.0 | 16.0 | 16.0 | 12.8 | 13.0 | 13.0 | 15.0 | 13.0 | 16.0 | 14.0 |
| $Na_2O$ | 4.0 | 4.0 | 4.0 | 3.2 | 4.0 | 5.0 | 2.0 | 4.0 | 5.0 | 3.5 |
| $K_2O$ | 0 | 0 | 0 | 0 | 0 | 0 | 2.0 | 0 | 0 | 0 |
| MgO | 2.0 | 2.0 | 2.0 | 6.0 | 2.0 | 3.0 | 2.0 | 4.0 | 0 | 2.0 |
| CaO | 0 | 0 | 0 | 0 | 0 | 0 | 0 | 1.0 | 0 | 0 |
| $ZrO_2$ | 1.0 | 0.5 | 2.0 | 2.0 | 1.5 | 0 | 2.0 | 1.0 | 2.5 | 2.0 |
| Li/R | 0.80 | 0.80 | 0.80 | 0.80 | 0.76 | 0.72 | 0.79 | 0.76 | 0.76 | 0.80 |
| $Kc_0$ | 1.02 | 1.03 | 0.98 | 1.02 | 1.11 | 1.07 | 1.01 | 1.03 | 0.98 | 1.07 |
| S | 513 | 510 | 350 | 530 | 478 | 421 | 473 | 451 | 435 | 426 |
| t | 80 | 86 | 84 | 71 | 90 | 91 | 65 | 73 | 88 | 87 |

The present invention is applicable to e.g. a cover glass of a display device.

The entire disclosures of Japanese Patent Application No. 2010-139396 filed on Jun. 18, 2010 and Japanese Patent Application No. 2011-085445 filed on Apr. 7, 2011 including specifications, claims and summaries are incorporated herein by reference in their entireties.

What is claimed is:

1. Glass for a display device, which comprises, as represented by mole percentage based on the following oxides, from 61 to 72% of $SiO_2$, from 8 to 17% of $Al_2O_3$, from 6 to 18% of $Li_2O$, from 2 to 15% of $Na_2O$, from 0 to 8% of $K_2O$, from 0 to 6% of MgO, from 0 to 6% of CaO, from 0 to 4% of $TiO_2$, and from 0 to 2.5% of $ZrO_2$, and having a total content $R_2O$ of $Li_2O$, $Na_2O$ and $K_2O$ of from 15 to 25%, a ratio $Li_2O/R_2O$ of the $Li_2O$ content to $R_2O$ of from 0.59 to 0.8, and a total content of MgO and CaO of from 0 to 9%, wherein the glass contains no BaO, and wherein the glass has a compressive strength of 250 to less than 1,200 MPa.

2. The glass for a display device according to claim 1, which contains at most 68% of $SiO_2$, at most 15% of $Al_2O_3$, at most 16% of $Li_2O$, at most 13% of $Na_2O$, at most 7% of $K_2O$, from 0 to 5% of MgO, from 0 to 5% of CaO, and from 0 to 2% of $TiO_2$, and has $R_2O$ of from 16 to 23%.

3. The glass for a display device according to claim 1, which contains at most 70% of $SiO_2$, at most 15% of $Al_2O_3$, at least 10% of $Li_2O$, at most 10% of $Na_2O$, and from 0 to 6% of $K_2O$, and has $R_2O$ of at most 22% and $Li_2O/R_2O$ of 0.6 to 0.8.

4. The glass for a display device according to claim 1, which contains at most 68% of $SiO_2$, at most 15% of $Al_2O_3$, at least 12% of $Li_2O$, at most 6% of $Na_2O$, from 0 to 3% of $K_2O$, at least 1% of MgO, from 0 to 2% of CaO, and from 0 to 1% of $TiO_2$, and has $R_2O$ of at most 22% and $Li_2O/R_2O$ of 0.7 to 0.8.

5. The glass for a display device according to claim 1, which has a fracture toughness value of at least 0.85 MPa·m$^{1/2}$.

6. A glass plate made of the glass for a display device as defined in claim 1, produced by a float process or a fusion method.

7. A glass plate for a display device, obtained by subjecting a glass plate made of the the glass for a display device as defined in claim 1 to chemical tempering treatment.

8. The glass plate for a display device according to claim 7, wherein the glass plate is produced by a float process or a fusion method, and the surface is a fire polished surface.

9. The glass plate for a display device according to claim 7, which has a fracture toughness value of at least 1.0 MPa·m$^{1/2}$.

10. A method for producing a glass plate for a display device, which comprises immersing a glass plate made of glass for a display device comprising, as represented by mole percentage based on the following oxides, from 61 to 72% of $SiO_2$, from 8 to 17% of $Al_2O_3$, from 6 to 18% of $Li_2O$, from 2 to 15% of $Na_2O$, from 0 to 8% of $K_2O$, from 0 to 6% of MgO, from 0 to 6% of CaO, from 0 to 4% of $TiO_2$, and from 0 to 2.5% of $ZrO_2$, and having a total content $R_2O$ of $Li_2O$, $Na_2O$ and $K_2O$ of from 15 to 25%, a ratio $Li_2O/R_2O$ of the $Li_2O$ content to $R_2O$ of from 0.59 to 0.8, and a total content of MgO and CaO of from 0 to 9%, wherein the glass contains no BaO, in a molten salt to carry out chemical tempering treatment, wherein the molten salt comprises, as represented by mole percentage, from 0 to 7% of $LiNO_3$, from 60 to 100% of $NaNO_3$, and from 0 to 40% of $KNO_3$, and wherein the glass has a compressive strength of 250 to less than 1,200 MPa.

11. The method for producing a glass plate for a display device according to claim 10, wherein the chemical tempering treatment is carried out by immersing the glass plate in the molten salt at a temperature of at most 425° C. for an immersion time of at most 2 hours.

12. A display device having a cover glass, wherein the cover glass is the glass plate for a display device as defined in claim 7.

13. A portable device containing the display device as defined in claim 12.

14. A television containing the display device as defined in claim 12.

15. A touch panel containing the display device as defined in claim 12.

16. A chassis for a display device, in which a display device is contained, which has the glass plate for a display device as defined in claim 7.

17. Glass for a display device, which comprises, as represented by mole percentage based on the following oxides, from 61 to 72% of $SiO_2$, from 8 to 17% of $Al_2O_3$ from 6 to 18% of $Li_2O$, from 2 to 8% of $Na_2O$, from 0 to 8% of $K_2O$, from 0 to 6% of MgO, from 0 to 6% of CaO, from 0 to 4% of $TiO_2$, and from 0 to 2.5% of $ZrO_2$, and having a total content $R_2O$ of $Li_2O$, $Na_2O$ and $K_2O$ of from 15 to 25%, a ratio $Li_2O/R_2O$ of the $Li_2O$ content to $R_2O$ of from 0.59 to 0.8, and a total content of MgO and CaO of from 0 to 9%, and
wherein the glass has a compressive strength of 250 to less than 1,200 MPa.

18. The glass for a display device according to claim 17, which contains at most 68% of $SiO_2$, at most 15% of $Al_2O_3$, at most 16% of $Li_2O$, from 2% to 8% of $Na_2O$, at most 7% of $K_2O$, from 0 to 5% of MgO, from 0 to 5% of CaO, and from 0 to 2% of $TiO_2$, and has $R_2O$ of from 16 to 23%.

19. The glass for a display device according to claim 17, which contains at most 70% of $SiO_2$, at most 15% of $Al_2O_3$, at least 10% of $Li_2O$, at most 8% of $Na_2O$, and from 0 to 6% of $K_2O$, and has $R_2O$ of at most 22% and $Li_2O/R_2O$ of 0.6 to 0.8.

20. The glass for a display device according to claim 17, which contains at most 68% of $SiO_2$, at most 15% of $Al_2O_3$, at least 12% of $Li_2O$, at most 6% of $Na_2O$, from 0 to 3% of $K_2O$, at least 1% of MgO, from 0 to 2% of CaO, and from 0 to 1% of $TiO_2$, and has $R_2O$ of at most 22% and $Li_2O/R_2O$ of 0.7 to 0.8.

21. The glass for a display device according to claim 17, which has a fracture toughness value of at least 0.85 $MPa \cdot m^{1/2}$.

22. A glass plate made of the glass for a display device as defined in claim 17, produced by a float process or a fusion method.

23. A glass plate for a display device, obtained by subjecting a glass plate made of the glass for a display device as defined in claim 17 to chemical tempering treatment.

24. The glass plate for a display device according to claim 23, wherein the glass plate is produced by a float process or a fusion method, and the surface is a fire polished surface.

25. The glass plate for a display device according to claim 23, which has a fracture toughness value of at least 1.0 $MPa \cdot m^{1/2}$.

26. A method for producing a glass plate for a display device, which comprises immersing a glass plate made of glass for a display device comprising, as represented by mole percentage based on the following oxides, from 61 to 72% of $SiO_2$, from 8 to 17% of $Al_2O_3$, from 6 to 18% of $Li_2O$, from 2 to 8% of $Na_2O$, from 0 to 8% of $K_2O$, from 0 to 6% of MgO, from 0 to 6% of CaO, from 0 to 4% of $TiO_2$, and from 0 to 2.5% of $ZrO_2$, and having a total content $R_2O$ of $Li_2O$, $Na_2O$ and $K_2O$ of from 15 to 25%, a ratio $Li_2O/R_2O$ of the $Li_2O$ content to $R_2O$ of from 0.59 to 0.8, and a total content of MgO and CaO of from 0 to 9%, in a molten salt to carry out chemical tempering treatment, wherein the molten salt comprises, as represented by mole percentage, from 0 to 7% of $LiNO_3$, from 60 to 100% of $NaNO_3$, and from 0 to 40% of $KNO_3$, and
wherein the glass has a compressive strength of 250 to less than 1,200 MPa.

27. The method for producing a glass plate for a display device according to claim 26, wherein the chemical tempering treatment is carried out by immersing the glass plate in the molten salt at a temperature of at most 425° C. for an immersion time of at most 2 hours.

28. A display device having a cover glass, wherein the cover glass is the glass plate for a display device as defined in claim 23.

29. A portable device containing the display device as defined in claim 28.

30. A television containing the display device as defined in claim 28.

31. A touch panel containing the display device as defined in claim 28.

32. A chassis for a display device, in which a display device is contained, which has the glass plate for a display device as defined in claim 23.

33. The glass for a display device according to claim 1, wherein the ratio $Li_2O/R_2O$ of the $Li_2O$ content to $R_2O$ is from 0.6 to 0.8.

34. The method for producing a glass plate for a display device according to claim 10, wherein the ratio $Li_2O/R_2O$ of the $Li_2O$ content to $R_2O$ is from 0.6 to 0.8.

35. The glass for a display device according to claim 17, wherein the ratio $Li_2O/R_2O$ of the $Li_2O$ content to $R_2O$ is from 0.6 to 0.8.

36. The method for producing a glass plate for a display device according to claim 26, wherein the ratio $Li_2O/R_2O$ of the $Li_2O$ content to $R_2O$ is from 0.6 to 0.8.

* * * * *